INVENTOR
RAYMOND C. GOERTZ
BY
Herbert J. Thompson
his ATTORNEY.

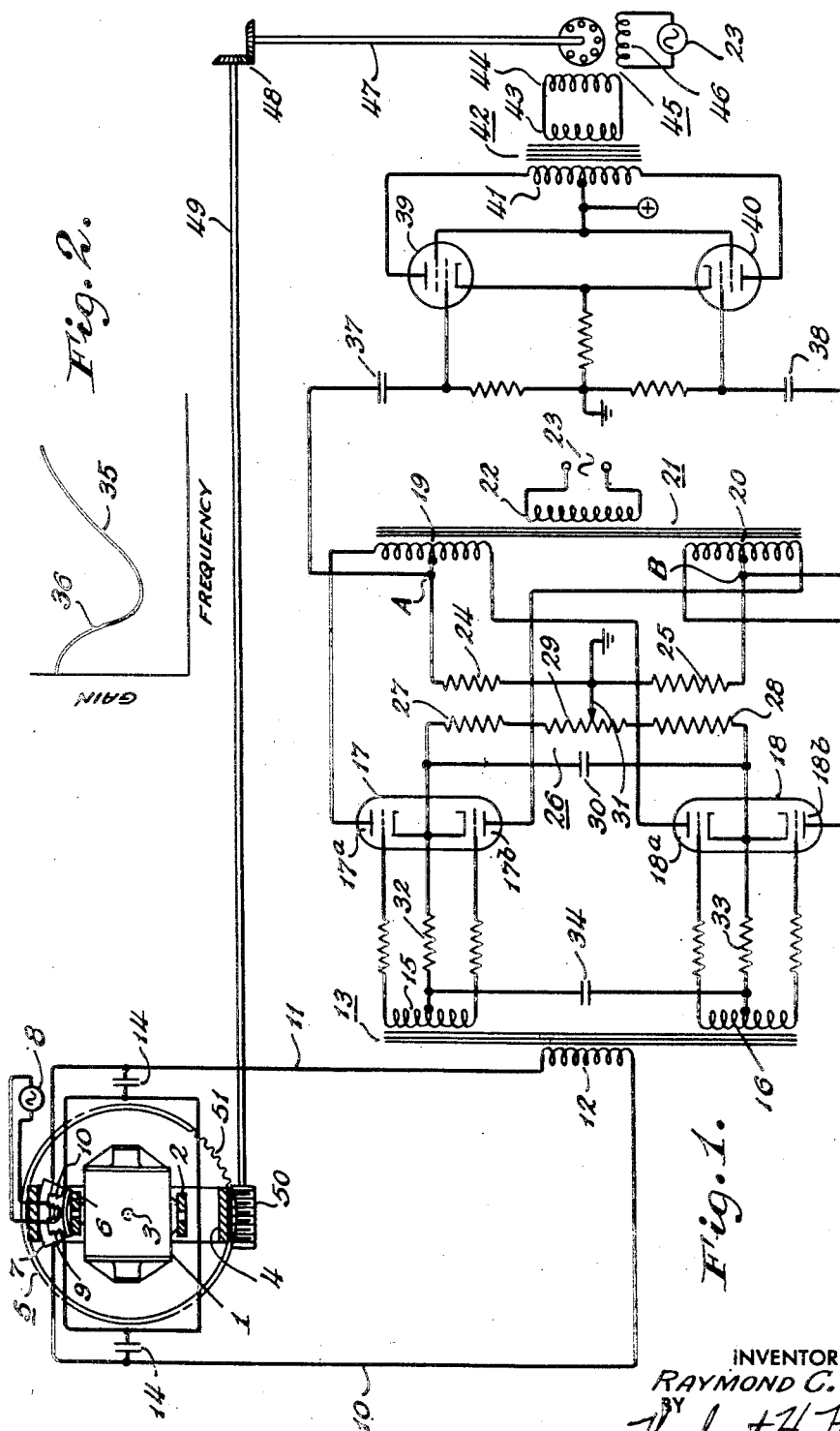

Patented Aug. 8, 1950

2,517,556

UNITED STATES PATENT OFFICE 2,517,556

CONTROL CIRCUIT FOR DERIVING RATE AND INTEGRAL TERMS

Raymond C. Goertz, Hempstead, N. Y., assignor to The Sperry Corporation, a corporation of Delaware Application April 16, 1945, Serial No. 588,590

15 Claims. (Cl. 318—31)

My invention relates to control circuits and, particularly, to a circuit which is adapted for use in a servo system for controlling the operation of a servomotor.

In controlling the servomotor in some types of follow-up systems, it is highly desirable to so control the motor that it will operate in the correct direction and at the proper position, depending upon the nature of the control signal, without appreciable lag and with a minimum of hunting or oscillation in the system. In other words, in a follow-up system, such as in the system herein illustrated and described showing one embodiment of the present invention, a positionable object is driven by a servomotor in response to a control signal or voltage to lie in correspondence with or to move substantially in synchronism with a reference member. The present invention relates to an amplifier for use in controlling a servo in such a manner that the lag between the reference member and the driven object is a minimum, while hunting in the system is likewise reduced to a minimum.

It is an object of the present invention to provide a control circuit or amplifier which is so constructed and arranged that the gain of the circuit or of an electron tube embodied therein is controlled to provide a component in the output of said tube and circuit substantially proportional to a time derivative or rate-of-change of input signal to the circuit; and which circuit also embodies means for further controlling the gain of the circuit or of the tube so as to supply a component in the output thereof substantially proportional to a time integral of the input signal.

It will be understood, as hereinafter pointed out in connection with a detailed description of one embodiment of the present invention, that the component proportional to the time derivative of the input signal functions as a damping signal whereby to reduce hunting or oscillations of the system around zero error while the output component, which is proportional to a time integral of the input signal, functions to reduce lag in the system.

It is another object of the present invention to provide a circuit embodying an electron tube, or tubes, having means associated with the cathode thereof to produce an output component proportional to rate of change of input signal supplied to the grid thereof and means cooperable with said first mentioned means for providing an output component proportional to a time integral of the input signal.

More particularly, it is an object of the present invention to provide a control circuit embodying an electron tube having a resistance-capacitance network connected with the cathode thereof and a resistance-capacitance circuit cooperably connected with said network and with the grid of the tube, the cathode-connected rate network functioning to provide a rate component and the grid-connected integrating circuit functioning to provide an integration component in the output of the tube; and, more particularly, a circuit of the foregoing character in which the time constants of said network and said circuit differ, that of said integrating circuit being preferably larger.

A still further object resides in providing a control circuit or amplifier in which control voltages or voltage components proportional to rate of change of control signal or a time integration of the control signal, supplied to the grid of the tube, will appear in the plate circuit or output thereof, which circuit is comparatively simple in design, utilizing a minimum number of parts to produce said voltage components, whereby a saving in space, weight and materials is effected.

With the foregoing and still other objects in view, my invention includes the novel elements and the combinations and arrangements thereof described below and illustrated in the accompanying drawings, in which—

Fig. 1 shows a wiring diagram of a preferred form of circuit of the present invention and diagrammatically illustrates an exemplary follow-up servo system embodying the control circuit;

Fig. 2 is a frequency response curve of the control circuit of the present invention;

Figure 3:
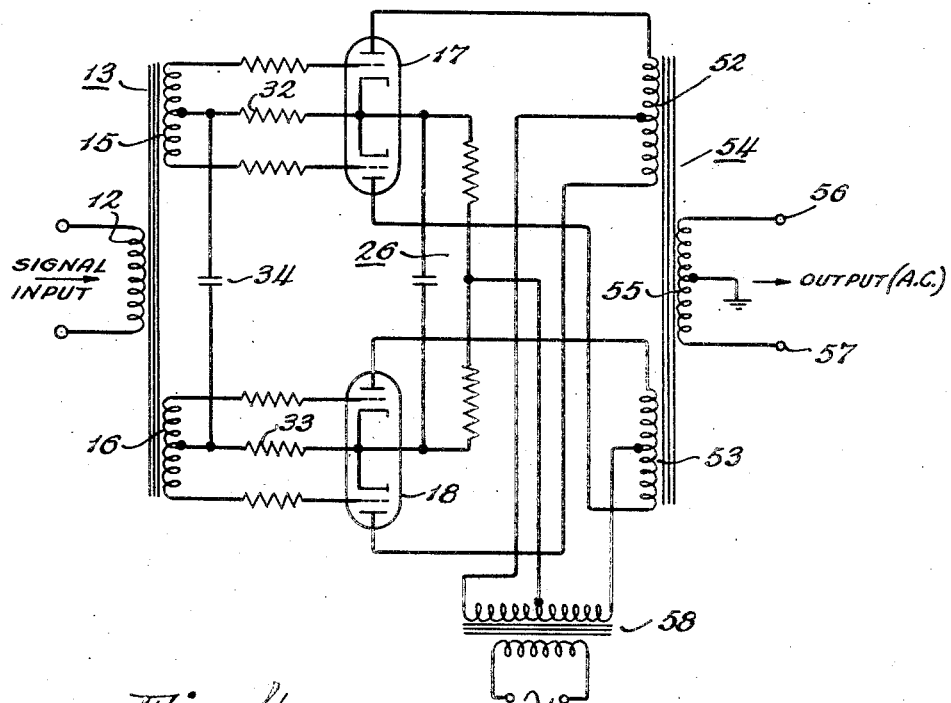
Fig. 3 is a modified form of control circuit.

Fig. 1 has diagrammatically represented therein a follow-up system embodying the control circuit of the present invention mainly for exemplary purposes and also to disclose a novel follow-up type of servo system which has highly desirable operating characteristics for the purposes intended by virtue of the inclusion therein of a control circuit of the character hereinafter particularly pointed out. I have shown in Fig. 1 a follow-up system which is used in connection with a gyroscopic compass and the function of this system is to maintain the phantom ring of the compass in positional agreement with the vertical ring of the gyroscope. It should be quite evident that in an instrument of this character, minimum lag should be present with minimum hunting or oscillation about the zero error position or that position of the parts in which the vertical and phantom rings lie in correspondence.

Referring first to Fig. 1, 1 indicates generally the rotor bearing case of a gyroscopic compass which is rotatably mounted on the vertical ring 2 which, in turn, is mounted to rotate in azimuth about the vertical or azimuth axis 3 of the instrument. The suspension for the gyroscope rotor-bearing case and its vertical ring and other parts of the gyroscopic compass has been purposely eliminated in the drawings since they in no way form a part of the present invention and would serve merely to confuse the showing. A phantom ring 4 is mounted to rotate about an axis coincident with the vertical axis 3 of the gyroscope, and it is the function of the follow-up system shown in Fig. 1 to maintain these two rings in alignment.

For purposes of measuring the angular difference in position between the vertical and phantom rings, I have shown an E-type pick-off 5. Of course, any suitable type of pick-off could be employed. This pick-off comprises an armature 6 affixed to the vertical ring and a field comprising the core 7, bearing windings thereon, which is affixed to the phantom ring. The core 7 and armature 6 are formed of any suitable, preferably permeable magnetic material and the core is formed generally in the shape of an E, having an exciting winding mounted on the center leg thereof, which winding is connected with a suitable source of alternating current as indicated at 8. Pick-up windings 9 and 10 are mounted on the two end legs and are connected together in series, voltage-opposing relationship and through conductors 10, 11 to the primary 12 of an input transformer 13. Tuning condensers 14 may be connected as desired across each pickup winding. The pick-off serves to provide a zero signal voltage output when the phantom and vertical rings are aligned. However, when relative angular movement thereof occurs about the axis 3, a signal voltage output will appear which will be of an amplitude dependent upon the error or angular displacement between the two rings and will be of a phase sense depending upon the direction in which the angular difference in position occurs.

The alternating signal voltage which is derived from pick-off 5 will therefore provide an indication of both the magnitude of displacement between the two rings and also the direction of said displacement. Opposite ends of the two secondaries 15 and 16 of the input transformer are connected with the grids of twin triode electron tubes 17 and 18. This stage of the circuit functions as a full wave, phase-sensitive circuit or amplifier so that the A. C. output derived from the plates of the tubes will, in the embodiment shown, have a phase sense with respect to the voltage employed in exciting one field of the servo motor which is dependent upon the phase sense of the signal voltage or the direction in which displacement between the vertical and phantom rings has occurred.

To obtain phase sensitivity, plate potentials for the plates of the tubes are derived from the secondaries 19 and 20 of transformer 21, the primary 22 of which is connected across a suitable source of alternating current 23 which is preferably the same as that employed in exciting the servomotor and that employed in exciting the pick-off 5. One end of secondary 19 is connected to one of the plates 17a of tube 17 and the other end thereof to one of the plates 18a of the tube 18. It will be noted that the grids of the tubes which cooperate with these plate elements are connected so that the input signal is applied thereto in like phase or polarity sense. Hence, for a given phase relationship of the control or input signal with respect to the alternating plate potentials derived from secondary 19 of transformer 21, one of said plates, such as 17a of tube 17, will conduct on one half cycle and plate 17b will conduct on the next half cycle. For an input signal of opposite phase sense the plates 18a and 18b will conduct being driven positive when their associated grids are driven positive by the signal. The plates 17b and 18b of these tubes are similarly connected with the secondary 20 of the transformer 21 to function in the foregoing manner. When the phase of the input signal changes as compared to that above assumed, the portions of the two tubes embodying the plates 17b and 18b, connected with the secondary 20, will operate. The plate circuits further include resistors 24, 25 which are connected between center taps on the secondaries 19 and 20 and ground. To the cathodes of each tube is connected a resistance-capacitance network indicated generally at 26 and which, in the embodiment illustrated, comprises the resistances 27 and 28 and potentiometer 29, all connected in series, and shunted by a condenser 30. The wiper 31 of the potentiometer is connected to ground for circuit balancing purposes.

The network 26 forms what may be termed a cathode rate circuit or a circuit which produces in the output of the tube, a voltage component proportional to rate of change of signal voltage input or of voltage impressed on the grid thereof. The value of the resistance in this network which is associated with the cathode of the tube is such as to provide degeneration of the tube, while the capacitance of the condenser is sufficient to delay this degeneration thereby providing delayed degeneration when a change in input signal occurs. This delayed degeneration produces the component in the output of the tube or tubes which is substantially proportional to rate of change of the signal voltage impressed on the grids of these tubes or to a first-time derivative thereof. When I speak of rate of change of signal voltage in connection with an alternating voltage, it will, of course, be understood that I mean rate of change of signal voltage envelope in amplitude.

For example, the above described cathode rate circuit may include more resistance than is normally used for bias purposes, say of the order of 10 to 20 thousand ohms and a capacitance of about one microfarad, or a resistance which is of the order of the impedance in the plate circuit of the tube. A more detailed explanation of this type of rate circuit is disclosed in the copending application of R. D. McCoy, Serial No. 495,297, which is assigned to the assignee of the present invention, and which matured into United States Patent No. 2,464,249 on March 15, 1949.

In accordance with the present invention, however, I additionally provide means in circuit with the electron tubes 17 and 18, which cooperate with the network 26 to produce a component in the output of the tubes which is substantially proportional to a time integral of the error signal. This circuit comprises the resistors 32 and 33 which are connected respectively between the cathodes of tube 17 and a mid-tap on the secondary 15 of the input transformer and between the cathode of tube 18 and a mid-tap on the secondary 16 of the input transformer. A condenser 34 is connected between the midtaps of secondaries 15 and 16 as shown. This last-described resistance and capacitance circuit functions so to control the gain of the tubes that the output therefrom will embody a component which is substantially proportional to a time integral of the error voltage.

The integration affect produced by the last-described circuit may be explained as follows. It will be noted that the resistors 32 and 33 are connected in series with the condenser 34 between the cathodes of the two tubes 17 and 18. In other words, this circuit is connected in parellel with the network 26. Hence, the voltage across this network will be applied across the integrating circuit, charging the condenser 34 which is connected to apply its charge or potential to the grids of the tubes. The resistance-capacitance circuit serves to integrate the voltage across the network 26, and further controls the gain of the tube or tubes so as to produce an output component proportional to an integration of the input signal, it being observed that the voltage across the network 26 is dependent upon the magnitude or amplitude of the input signal. Preferably, the time constant of the integrating circuit differs from the time constant of the network 26, the time constant of the integrating network being preferably large in comparison to that of the rate network.

The component of voltage output from the tubes above described, which is proportional to the rate of change of the input signal or which may be termed a rate component, functions to minimize oscillations or hunting of the system about a zero error or zero error signal position. The component which is proportional to an integration of the error functions to reduce the lag in the system so that the servomotor may provide a more rapid response or may drive the phantom ring to follow the vertical ring with a smaller error. Hence, in the novel circuit of the present invention, both of these components are obtained by controlling the gain of the tube or tubes, thereby providing a control circuit with a minimum number of elements or component parts essential to provide the desired number and character of control components in the output thereof.

The gain vs. frequency curve, illustrated in Fig. 2, generally portrays the gain characteristics of an amplifier embodying the novel circuit of the present invention. The somewhat linear portion of the curve 35 represents the changing gain of the amplifier produced through the operation of the cathode rate circuit or network 26 while the portion of the curve indicated generally at 36 represents the effect of the gain of the amplifier which is produced by the integration network.

In the operation of the circuit shown in Fig. 1 and above described, an alternating voltage appears in the output of the tubes 17 and 18 and across the points A—B when an error voltage is impressed on the grids of these tubes. This A. C. voltage output will be of a magnitude proportional to the difference currents in resistors 24 and 25. A further characteristic of this circuit should be noted. If a D. C. voltage is applied to the grids of the tubes at the points of connection of the condenser 34 with said grids, an A. C. output will appear across the points A—B. Therefore, the voltage derived from condenser 34 which is a D. C. integration voltage will produce an A. C. output. If an error voltage be supplied from the input transformer to the tubes 17 and 18, an output with full gain will be initially obtained since condenser 30 will serve temporarily to shunt the voltage appearing across resistors 27 and 28 and potentiometer 29 or, in other words, a time interval will initially elapse during which condenser 30 will take on a charge, thereby allowing full gain of the tubes during this period. However, after a relatively short time interval, degeneration of the tubes will occur. This degeneration is thereafter removed because condenser 34 will have taken on its charge and will impress a voltage on the grids of the tubes. In other words, the condenser 34 allows the potential of the grids to follow the cathodes, and this following action is relatively slow as compared to the time constants of the cathode rate network 26.

In the embodiment of my invention shown in Fig. 1, the alternating voltage output of tubes 17 and 18 which appears across the points A—B is coupled through condensers 37 and 38 to the control grids of tubes 39 and 40 which are power tubes. The plates of these tubes are connected to opposite ends of the primary 41 of an output transformer 42, a mid-tap on which is connected to a suitable source of plate potential as shown. Secondary 43 of the output transformer 42 is connected with one field winding 44 of a two-phase motor 45, the other field winding 46 of which is connected with a suitable source of alternating current such as the source 23. Suitable phase-shifting networks, preferably in connection with field 46, may be incorporated to provide the desired phase relationship between the currents in the two field windings of the motor.

The circuit shown in Fig. 1 functions as a full wave, phase-sensitive amplifier, the phase of the signal supplied to the input transformer 13 being compared with the phase of a reference frequency or current which is derived from the source 23 and supplied to the plates of the tubes 17 and 18 as hereinbefore described. Hence, the current output of output transformer 42 will depend in amplitude upon the amplitude or magnitude of the error signal, and its phase relation with respect to the source 23, which is also employed in exciting the motor 45, will depend upon the direction in which the error has occurred, or, in the direction in which, in the embodiment illustrated, the phantom and vertical rings have relatively moved. The motor 45, as somewhat schematically shown, drives through shaft 47, bevel gears 48, shaft 49 and worm 50, which meshes with worm wheel 51, to drive the phantom ring 4 which is affixed to the worm wheel 51.

While there may appear an A. C. voltage across the points A—B in the circuit of Fig. 1 when there is no error voltage, these voltage outputs from the tubes will be of the same phase and magnitude and will therefore produce no output to the motor. In order to avoid A. C. output from the first stage of the amplifier or from the points A—B to the next stage, an alternative form of circuit, such as that shown in Fig. 3, may be employed. In this circuit, the signal input is impressed across the primary 12 of the input transformer 13 and the secondaries 15 and 16 thereof are connected with the grids of the tubes 17 and 18 as hereinbefore described in connection with Fig. 1. Similarly, this circuit embodies the cathode rate network 26 and the integrating circuit or network comprising resistors 32 and 33 and capacitance 34. However, the outputs from the plates of the tubes 17 and 18 in this case are supplied to the primaries 52 and 53 of coupling transformer 54, the secondary 55 of which may have a grounded center tap and is connected to terminals 56 and 57 which may be connected in any desired way with the next stage of the amplifier. The plate potentials are, in this embodiment, derived from the secondary of transformer 58, the primary of which is connected with a source of reference voltage such as source 23.

Figure 4:
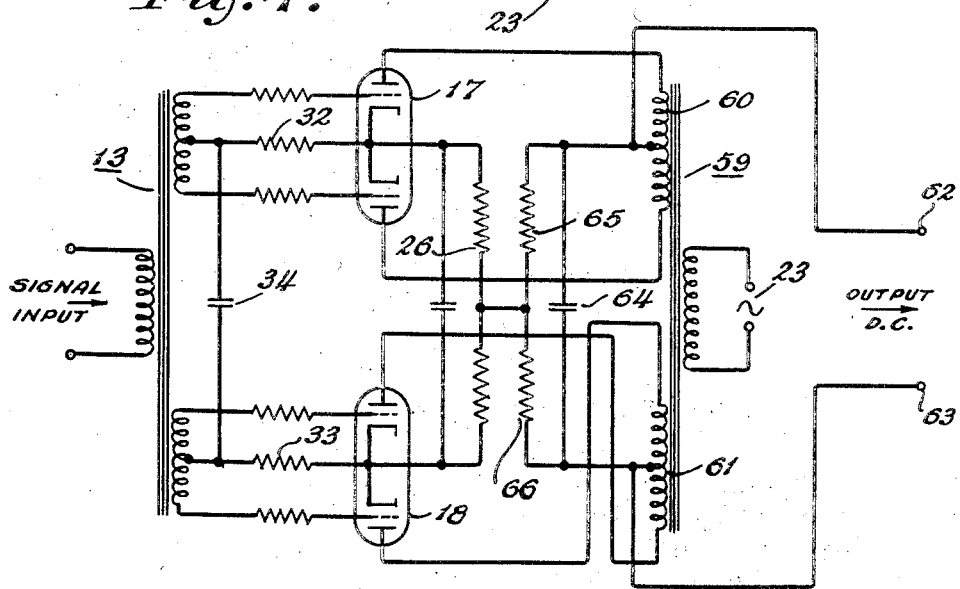
Fig. 4 is a wiring diagram of a still further modified form of control circuit.

The above-described embodiments of my invention supply an A. C. voltage output having components substantially proportional to time rate of change of signal voltage input and to a time integral thereof. A D. C. voltage output having corresponding components may be provided by employing the circuit shown in Fig. 4. This circuit is generally similar to those hereinbefore described, comprising the input transformer 13 and twin triodes 17 and 18. The cathode rate-taking network 26 is connected between the cathodes of these tubes and the integrating network or circuit comprising the resistors 32 and 33 and the condenser 34 is associated with the network 26 and connected with the grids of the tube in the manner hereinabove described. However, in this circuit, a source of reference voltage 23 is connected to the plates of the tubes through a transformer 59, the secondaries of which are respectively associated with the two plates of each tube, the secondary winding 60 being connected between the plates of tube 17 and the secondary winding 61 being connected between the plates of the tube 18. However, it will be noted that the phase relationship of the plate potentials, applied to the plates of tube 18, is reversed relative to the phase of the signal voltage applied to the grids thereof as compared to the connection of the plate potentials to the plates of tube 17. The circuit of Fig. 4 operates as a full-wave, phase-sensitive rectifier supplying a D. C. voltage in the output thereof or across the terminals 62, 63 which in magnitude is proportional to the amplitude of the input signal voltage and in polarity sense is dependent upon the phase sense of the input signal or the direction in which the error occurred. The condenser 64 serves to filter out A. C. components in the output such that substantially only D. C. voltages appear across the resistors 65 and 66.

It will be noted that in the embodiment of my invention shown in Fig. 1, I have illustrated, by way of example, a two-phase alternating-current motor. The A. C. voltage output of the amplifier may contain a number of harmonics, but since the harmonics do not exceed approximately 30% of the fundamental, the amplifier will not experience saturation due only to harmonics.

It is to be understood that other types of servomotors such as D. C. and A. C. motors and the like may be embodied in a servo system in which an amplifier of the character of those hereinabove described is employed, and therefore the showing in Fig. 1 of one form of complete servo system is to be interpreted as purely illustrative and not in a limiting sense. Furthermore, the circuits may obviously be arranged for half-wave rather than full-wave operation as described herein in which case one of the twin triode tubes may be eliminated to provide a circuit or amplifier functioning in substantially the same manner as those herein described, but in which half-wave operation, modulation or rectification occurs rather than full-wave.

Furthermore, it will be understood that where I refer in the specification and claims to the grid of a tube, I mean by this term to include any and all types of control electrodes or control means for such tubes which, in response to a signal voltage supplied thereto, will operate to control the conductance of the tube.

While I have described by invention in its preferred embodiments it is to be understood that the words which I have used are words of description rather than of limitation and that changes within the purview of the appended claims may be made without departing from the true scope and spirit of my invention in its broader aspects.

What is claimed is:

1. A control circuit of the character described comprising an electron tube having plate, cathode and grid electrodes, means connected in the cathode circuit of said tube for producing delayed generation of said tube to thereby control the gain of said tube, means connected to integrate the voltage across said first mentioned means and means for supplying the integration voltage to the grid of said tube whereby further to control the gain of said tube.

2. A control circuit of the character described comprising an electron tube having plate, cathode and grid electrodes, means connected in the cathode circuit of said tube for producing in the plate circuit thereof an output component proportional to time rate of change of input signal supplied to the grid thereof; and means comprising an integrating network connected across said first mentioned means and in circuit with the grid of said tube for producing a tube output component proportional to a time integral of the input signal.

3. A control circuit of the character described comprising an electron tube having plate, cathode and grid electrodes, a first means comprising a network having resistance-capacitance connected with the cathode of said tube and having such values as to produce delayed degeneration of said tube, and a second means comprising resistance and capacitance for integrating the voltage across said first means and for applying the integration voltage to the grid of said tube.

4. A circuit of the character recited in claim 3, in which the time constant of the second means is large in comparison with the time constant of the first means.

5. A phase-sensitive control circuit for use in controlling the operation of a servomotor comprising a pair of electron tubes each having plate, cathode and grid electrodes, coupling means for impressing a control signal voltage on the grids of said tubes, means associated with the cathodes of said tubes for producing delayed degeneration thereof when a change in amplitude of the impressed signal voltage occurs whereby to provide a component in the output of the tubes proportional to rate of change of said signal voltage, and means for integrating the voltage across said second mentioned means and for applying the integration voltage to the grids of said tubes whereby to produce a component in the output of the tubes proportional to a time integral of the control signal voltage.

6. In a servo system comprising an electric motor and a source of signal voltage having a magnitude proportional to displacement error, a phase-sensitive signal amplifier having its input connected to receive said signal voltage and having its output connected in controlling relation to said motor, said signal amplifier comprising a pair of electron tubes, coupling means for impressing the control signal on the grids of said tubes, a network connected with the cathodes of said tubes and having resistance and capacitance of such values as to produce delayed degeneration when a change in signal voltage occurs, and means for integrating the voltage across said network and for applying the integration voltage to the grids of said tubes.

7. A control circuit of the character described comprising an electron tube having plate, cathode and grid electrodes, coupling means for impressing a control voltage on the grid of said tube, a network having resistance and capacitance connected with the cathode of said tube, said resistance and capacitance being of such values as to produce in the output of said tube a component proportional to rate of change of said control voltage, and means for integrating the voltage across said network and for applying the integration voltage to the grid of said tube.

8. A control circuit of the character described comprising an electron tube having plate, cathode and grid electrodes, coupling means for impressing a control voltage on the grid of said tube, a network having resistance and capacitance connected with the cathode of said tube, said resistance and capacitance being of such values as to produce in the output of said tube a component proportional to rate of change of said control voltage, and a second resistance-capacitance circuit connected to said network and to the grid of said tube for integrating the voltage across said network and for applying the integration voltage to the grid of said tube.

9. A circuit of the character recited in claim 8, in which the time constant of the second resistance-capacitance circuit is large in comparison with the time constant of the cathode-connected network.

10. A control circuit of the character described comprising an electron tube having plate, cathode and grid electrodes, coupling means for impressing a signal voltage on the grid of said tube, a parallel-connected resistance and capacitance connected in the cathode circuit of said tube, the values of said resistance and capacitance being such as to produce in the output of said tube a component proportional to rate of change of signal voltage, a series-connected resistance and capacitance connected in parallel with said first mentioned resistance and capacitance and connected at a point therebetween to the grid of said tube for producing a component in the tube output proportional to a time integral of the signal voltage.

11. In a servo system comprising an electric motor and a source of signal voltage having a magnitude proportional to displacement error, a phase sensitive signal amplifier having its input connected to receive said signal voltage and having its output connected in controlling relation to said motor, said signal amplifier comprising an electron tube, coupling means for impressing the control signal on the grid of said tube, means in the cathode circuit of said tube for producing delayed degeneration when a change in signal voltage occurs whereby to produce a component in the output of said tube proportional to the rate of change of signal voltage impressed on the grid thereof, and means for integrating the voltage across said last-mentioned means and for applying the integration voltage to the grid of said tube.

12. In a servo system comprising an electric motor and a source of signal voltage having a magnitude proportional to displacement error, a phase sensitive signal amplifier having its input connected to receive said signal voltage and having its output connected in controlling relation to said motor, said signal amplifier comprising an electron tube, coupling means for impressing the control signal on the grid of said tube, an impedance-reactance network connected with the cathode of said tube and having such impedance and reactance values as to produce delayed degeneration when a change in signal voltage applied to the grid thereof occurs, and means for integrating the voltage across said network and for applying the integration voltage to the grid of said tube.

13. In a servo system comprising an electric motor and a source of signal voltage having a magnitude proportional to displacement error, a phase sensitive signal amplifier having its input connected to receive said signal voltage and having its output connected in controlling relation to said motor, said signal amplifier comprising an electron tube, coupling means for impressing the control signal on the grid of said tube, means connected in the cathode circuit of said tube for producing delayed degeneration when a change in signal voltage occurs, and an impedance-reactance integrating network connected with said last-mentioned means for integrating the voltage thereacross and for applying the integration voltage to the grid of said tube.

14. In a servo system comprising an electric motor and a source of signal voltage having a magnitude proportional to displacement error, a phase sensitive signal amplifier having its input connected to receive said signal voltage and having its output connected in controlling relation to said motor, said signal amplifier comprising an electron tube, coupling means for impressing the control signal on the grid of said tube, an impedance-reactance network connected with the cathode of said tube and having such impedance and reactance values as to produce delayed degeneration when a change in signal voltage applied to the grid thereof occurs, and an impedance-reactance integrating network connected with said first-mentioned network for integrating the voltage thereacross and for applying the integration voltage to the grid of said tube.

15. A servo system of the character recited in claim 14 in which the time constant of the second-mentioned impedance-reactance network is larger than the time constant of the first-mentioned impedance-reactance network.

RAYMOND C. GOERTZ.

REFERENCES CITED

The following references are of record in the file of this patent:

UNITED STATES PATENTS

| Number | Name | Date |
| --- | --- | --- |
| 1,978,578 | Holst et al. | Oct. 30, 1934 |
| 2,040,014 | Moseley | May 5, 1936 |
| 2,222,172 | Dimmick | Nov. 19, 1940 |
| 2,251,973 | Beale et al. | Aug. 12, 1941 |
| 2,399,695 | Satterlee | May 7, 1946 |

Certificate of Correction

Patent No. 2,517,556                                                     August 8, 1950

RAYMOND C. GOERTZ

It is hereby certified that error appears in the printed specification of the above numbered patent requiring correction as follows:

Column 8, line 8, for the word "by" read *my*; line 21, for "generation" read *degeneration*;

and that the said Letters Patent should be read as corrected above, so that the same may conform to the record of the case in the Patent Office.

Signed and sealed this 16th day of January, A. D. 1951.

[SEAL]

THOMAS F. MURPHY,
*Assistant Commissioner of Patents.*